United States Patent [19]

Green et al.

[11] Patent Number: 4,531,740

[45] Date of Patent: Jul. 30, 1985

[54] REMOTE CONTROL SYSTEM FOR A VIDEO COMPUTER GAME

[75] Inventors: Dan Green, Cranford, N.J.; Sandor Goldner, Brooklyn, N.Y.

[73] Assignee: Cynex Manufacturing Corporation, Hillside, N.J.

[21] Appl. No.: 506,652

[22] Filed: Jun. 22, 1983

[51] Int. Cl.³ ............................................. A63F 9/22
[52] U.S. Cl. ....................... 273/148 B; 273/DIG. 28
[58] Field of Search ........... 273/1 E, 85 G, DIG. 28, 273/237; 434/323, 307, 350, 351, 876; 343/876; 358/49

[56] References Cited

U.S. PATENT DOCUMENTS 4,111,421  9/1978  Mierzwinski ............... 273/DIG. 28
4,352,492  10/1982  Smith ........................... 273/DIG. 28

OTHER PUBLICATIONS

"Playthings", Annual Retail Awards, Feb., 1981, p. 13.

Primary Examiner—Richard C. Pinkham
Assistant Examiner—MaryAnn Stoll Lastova
Attorney, Agent, or Firm—Goodman & Teitelbaum

[57] ABSTRACT

A remote control system for a video computer game having a portable controller unit with transmitter circuits responsive to manipulation of a joy stick for generating RF signals indicative of such manipulations. A reset switch and a game select switch is also provided for generating signals which are also sent as RF signals. A central receiver receives the RF signals from the portable controller unit and converts the manipulation signals into signals applicable to control the video game. The reset signal and the game select signal are sent to an actuator unit which is physically mounted onto the master control center and includes mechanical actuator mechanisms to mechanically engage the reset and game selector buttons on the master control center. The central receiver also includes detection elements to prevent random signals from disturbing the game during such time periods when it is not receiving signals from the transmitter controllers.

9 Claims, 9 Drawing Figures

REMOTE CONTROL SYSTEM FOR A VIDEO COMPUTER GAME

RELATIONSHIP TO OTHER APPLICATIONS

This application is an improvement over copending application Ser. No. 436,047 (now abandoned) filed on Oct. 22, 1982, entitled "Remote Control Video Computer Game", the assignee of which is identical to the assignee of the present invention, the entire application of which is hereinincorprated by reference.

BACKGROUND OF THE INVENTION

This invention relates to a video computer game, and more particularly to a television video game utilizing a video cartridge inserted in a master control center.

Typical video computer games utilize a master control center in which there are inserted various cartridges preprogrammed to play particular games onto a TV screen which is hard wired to the master control center. Control devices, typically of the joy stick type, are utilized for providing the signals to the master control center in order to control game movement. The joy sticks are generally hard wired to the master control center.

In the aforementioned copending application, there is described a remote control video computer game which utilizes joy sticks which do not have to be hard wired. The joy sticks include encoding and transmitting circuitry where by signals generated by the joy sticks are transmitted as RF signals. A receiver unit which is hard wired to the master control center includes suitable receiver and decoding circuitry which decodes the RF signals and applies them to the master control center. In this way, the joy sticks can be located at a distance from the TV set and still be utilized to control the game. Additionally, by eliminating the need for wiring between the joy stick controllers and the TV game, there is avoided a safety hazard which would occur with the wires being stretched across a room while the game is played.

Typically, the joy stick includes a handle which can radially move with respect to its axis about an axial pivot from a normally resting position. Within the joy stick controller, there are a number of pressure actuated switches circumscribing the axis of the handle in its rest position. As the handle is moved radially about, it causes closure of a single one or adjacent pairs of these switches. Typically, an additional firing button is included on the joy stick controller. Closure of these switches generate the game movements. These signals generated by closure of the switches are encoded as the RF signals and transmitted to the receiver.

The typical TV games include numerous switches at the master control center which are utilized during the course of the game in addition to the signals generated by the joy stick. For example, in order to reset the game a switch is provided at the master control center. Additionally, since the preprogrammed cartridge may include a number of games, a game selector switch is also provided at the master control center. When the joy stick controllers are hard wired to the master control center, as in the prior art, it is not difficult to have the players manipulate the reset and game selector switches directly on the master control center since the hard wire forces the players to be situated adjacent the master control center. However, when utilizing the remote control joy stick system described in the aforementioned copending application, it is an inconvenience for the players, who are now remotely positioned from the master control center, to get up and use the reset and game selector switches on the master control center each time a change in the game is required.

Additionally, when utilizing the remote control system described in the aforementioned copending application, the signals generated by the remote joy stick controller will be applied to the game so long as these signals are received. However, should the players move the joy stick controllers beyond the transmitting distance, the players will be unaware that they have exceeded the transmitting capabilities of the unit and, random noise signals may be generated which would cause erroneous game movements on the TV game.

Accordingly, the present invention provides further improvement to a remote control video computer game of the type described in the aforementioned copending application.

SUMMARY OF THE INVENTION

It is accordingly an object of the present invention to provide a remote control system for a computer video game which improves upon the system described in the aforementioned copending application.

A further object of the present invention is to provide a remote control system for a video computer game whereby the controller device, which is not hard wired to the master control center of a computer game, can be utilized not only for generating game movements, but also for additional controls such as reset, game selection, and the like.

Still another object of the present invention is to provide a video computer game having a portable controller which is not hard wired to the game and which includes an actuator unit which can be mounted onto a master control center to mechanically actuate a reset button and/or a game selector button on the master control center by remote switch control from the portable controller.

Still a further object of the present invention is to provide a remote control system for a video computer game having controller units which are not hard wired to the game and a receiver unit for receiving signals from the controller units and wherein the receiver unit provides a continuous indication when it is receiving signals from the controller units.

Still a further object of the present invention is to provide a remote control system for a video computer game having portable controller units which are not wired to the game and a receiver unit for receiving the signals from the portable controller units and wherein the receiver unit prevents application of random signals to the computer game should it not be receiving signals from the portable controller units.

Briefly, in accordance with the present invention, there is provided a remote control system for a video computer game including a portable controller unit and a receiver unit. The portable controller unit can generate manipulation signals indicative of the game movement. Switches are provided on the portable controller unit for selectively generating a game reset signal and/or a game selector signal, and the like. A transmitter means on the portable controller unit transmits both the manipulation signals and the various other game signals generated at the portable controller unit and transmits these as RF signals.

The receiver means receives the RF signals and converts these signals into control signals for application to the video computer game. Typically, there is also included an actuator unit which can mount directly onto the master control unit and includes mechanical manipulation means for mechanically operating the reset button in response to a reset control signal and mechanically operating the game selector button in response to a game selector control signal.

In accordance with an embodiment of the invention, the receiver unit can also include detection circuitry for detecting the periods of time when the receiver is not receiving RF signals and inhibiting any application of signals to the video computer game during these non receiving periods. Additionally, an indicator means can be included on the receiver unit providing an indication when the receiver unit is receiving the RF signals from the portable controller unit.

In an embodiment of the invention, the controller units are joy stick controllers having an elongated handle which can radially move with respect to its axis about an axial pivot from a normally resting position. A plurality of pressure actuated switches circumscribe the axis of the handle. Movement of the handle can cause closure of a single or pair of adjacent pressure actuated switches. The reset switch and/or the game selector switch is cause the effect of closure of non-adjacent pressure actuated switches.

The aforementioned objects, features and advantages of the invention will, in part, be pointed out with particularity and will, in part, become obvious from the following more detailed description of the invention taken in conjunction with the accompanying drawings, which form an integral part thereof.

BRIEF DESCRIPTION OF THE DRAWINGS

In the drawings.

In the various figures of the drawing, like reference characters designate like parts.

DESCRIPTION OF THE PREFERRED EMBODIMENT

Figure 1:
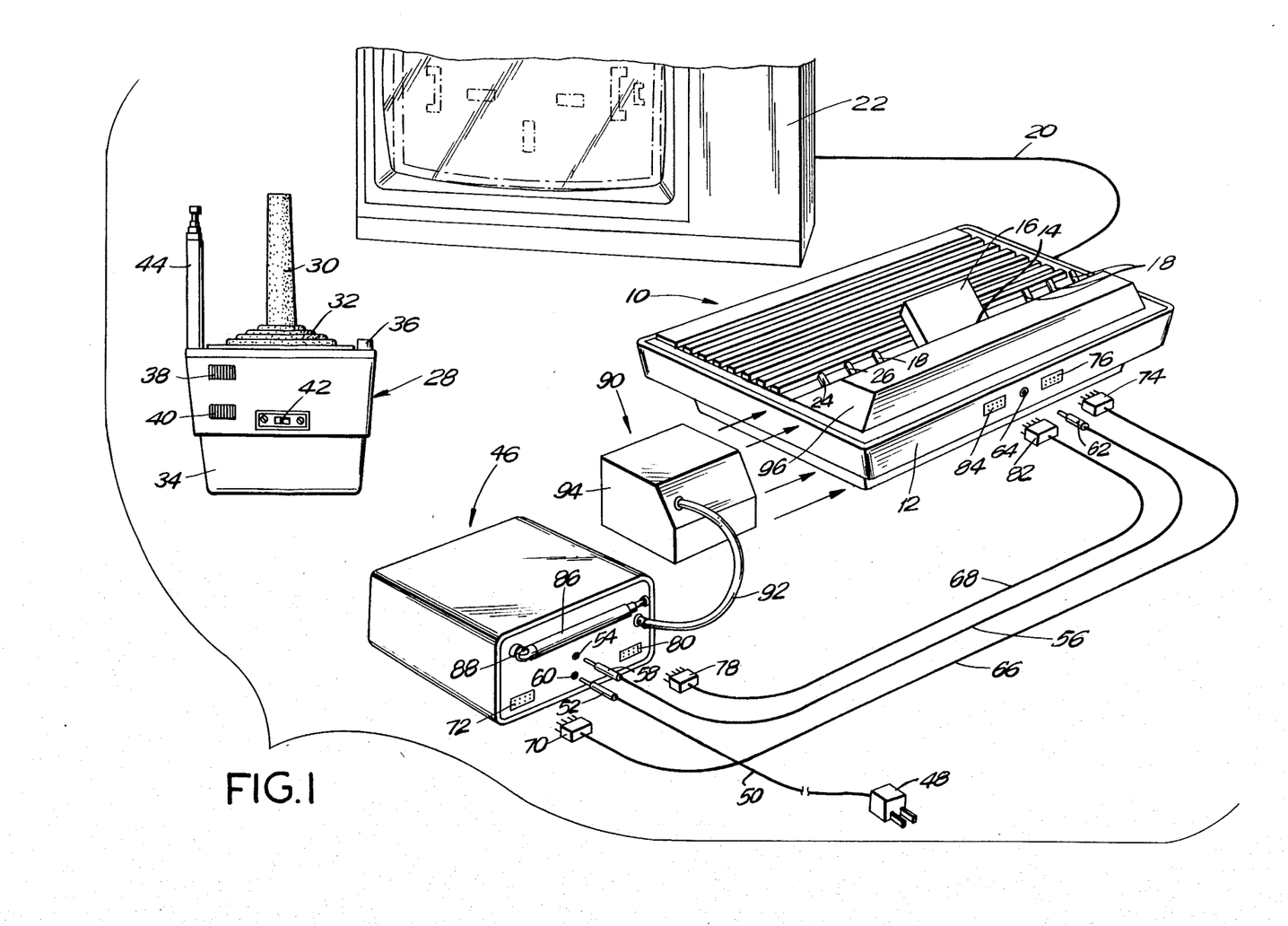
FIG. 1 is a perspective view of the video computer game including the remote control system of the present invention shown in conjunction with a TV monitor.

Referring to FIG. 1, there is shown a video computer game in accordance with the present invention comprising a master control center 10 including a housing 12 with an opening 14 in which there can be inserted a game cartridge 16 preprogrammed for various video games. A plurality of switches 18 are provided on the master control center through which selection can be made selecting particular games, resetting of the games, ON/OFF, level of playing, etc. Such master control centers are well known in the art and are readily available by numerous manufacturers. These remote control centers are hard wired through cable 20 to a TV console shown generally at 22. Such connection is also well known in the art.

While numerous master control centers are available, including by way of example the Atari Video Computer System and the Sears Tele-Game, the particular unit 10 as shown is similar to that of the Atari VCS. In that system, the first of the control switches 24 represents a reset button which can be moved downwardly on the master control center in order to reset the game. The second switch 26 represents a game select button which can likewise be moved downwardly in order to index the games on the cartridge and select the desired one of the various preprogrammed games available on the cartridge.

In order to provide for remote control of the master control center 10, there are provided one or more portable controller units one of which is shown at 28. The controller is shown to be of the joy stick controller type, one typical joy stick controller being described in U.S. Pat. No. 4,349,708 the entire contents of which are herein incorporated by reference.

In this type of joy stick controller, there is provided an elongated handle 30 secured by means of a peripheral rubberized collar 32 onto a housing 34. Within the controller there are provided a plurality of pressure actuated switches generally placed on a common plane within the housing and usually orthogonally positioned in such common plane. These pressure actuated switches circumscribe the axis of the handle. The handle is manipulatable in various radial positions by means of the flexible collar 32 therearound.

Deformible resilient annular members are superimposed over the switches. The annular members are attached to the handle at spaced locations so that displacement of the handle from its rest position causes a portion of the annular members to be pressed against and actuate one or adjacent two switches. Additionally, a firing button 36 can be provided which includes a further pressure actuator switch therebeneath so that depression of the firing button 36 generates a further signal. All of the signals generated by means of manipulation of the handle 30 as well as depression of the firing button 36 are used for game movements within the video game.

Also provided on the controller unit 28 is a first switch 38 which is used to generate a reset signal when it is desired to reset the game. Actuation of the reset switch 38 will cause the button 24 on the master control center to be depressed as will hereinafter be described. A second switch 40 is also provided on the controller unit 28 for utilization in game selection. Manipulation of the switch 40 will cause depression of the button 24 on the master control center as will hereinafter be described. An ON/OFF switch 42 is also provided on the controller unit 28 in order to turn on and off the local unit. Within the controller unit there are also provided transmitter circuits for converting all of the switch actuation signals into RF signals and transmitting them. Antenna 44 is provided on the controller unit for transmitting the particular RF frequency. When more than one controller unit is utilized, each controller unit will operate at its own particular transmitter frequency in order to particularly identify the specific controller unit in operation. Suitable batteries would also be contained within the controller unit for portable operation thereof.

Connected to the master control unit 10 there is provided a receiver unit 46. The usual adaptor 48 which is typically provided with the master control center 10 is now plugged directly into the receiver 46 by means of the wire 50 and plugs 52 insertable within the outlet 54. A separate wire 56 has one plug end 58 inserted within the receptacle 60 on the receiver unit and the other end having its plug 62 inserted inserted into the receptacle 64 at the master control center. Additional wires 66, 68 are provided for each of the left and right channel controls from the receiver 46 to the master control center 10. Wire 66 has a suitable plug 70 inserted within the receptacle 72 of the receiver unit while an additional plug 74 is inserted within the receptacle 76 at the master control center. Typically, plug 78 at one end of the wire 68 is inserted within the receptacle 80 in the receiver 46 with another plug 82 inserted within the receptacle 84 at the master control center 10. A receiving antenna 86 is provided on the receiver unit 46. The antenna is of the telescopic type and is shown interconnected by means of a swivel joint 88 so that it can be tucked away behind the receiver unit for storage when the receiver unit is not being utilized.

The receiver unit includes the single antenna 86 which can pick up both of the RF frequencies produced by two controller units. Contained within the receiver units 46 are two receiver circuits, each of which is respectively tuned to a corresponding frequency of one of the controller units. The receiver units will then convert the RF signals back to electrical signals which are then coupled by means of the wires to the master control center so that it can operate the game.

An actuator unit 90 is hard wired to the receiver 46 by means of the cable 92. The actuator unit 90 includes a housing 94 which can suitably mount directly onto the corner edge 96 of the master control center 10 and is held in place on the master control center by means of a friction fit, or other suitable coupling arrangement.

When the receiver unit receives either a reset signal or a game selector signal, the signal is sent to the actuator unit 90. Contained within the actuator unit there are suitable mechanical actuators which respond to these signals so as to respectively cause the proper button 24, 26 on the master control center to be depressed. In this manner, providing for a reset signal by means of the switch 38 on the controller unit will cause mechanical actuation of the reset button 24 on the master control center and similarly operation of the switch 40 at the controller units will cause mechanical acutation of the game selector button 26 at the master control center.

It is therefore appreciated that with the present remote control system, not only are game manipulation signals provided remotely from the master control center, but both reset and game selector signals are also provided remotely from the master control center. It should also be appreciated that while particular switches described control the reset and game selector buttons, other signals could be utilized and other control could be provided depending upon the particular type of video game unit being played.

As is described in the aforementioned copending application, at the control unit there is provided a transmitter which includes circuitry for converting the closure of the pressure acutated switches into encoded signals by means of a pulse width modulation encoder. The encoder produces a serially encoded waveform which is then applied to a modulator which switches an RF oscillator. A diode switch is provided at the output of the oscillator and connects to an antenna. The particular circuitry including the pulse width modulation encoder, modulator, RF oscillator, as well as a voltage regulator for regulating the ouput of the battery voltage utilized, can be formed by means of a single integrated circuit, tvpical of which is that produced by National Semiconductor as the LM 1871 RC Encoder/Transmitter.

Figure 2:
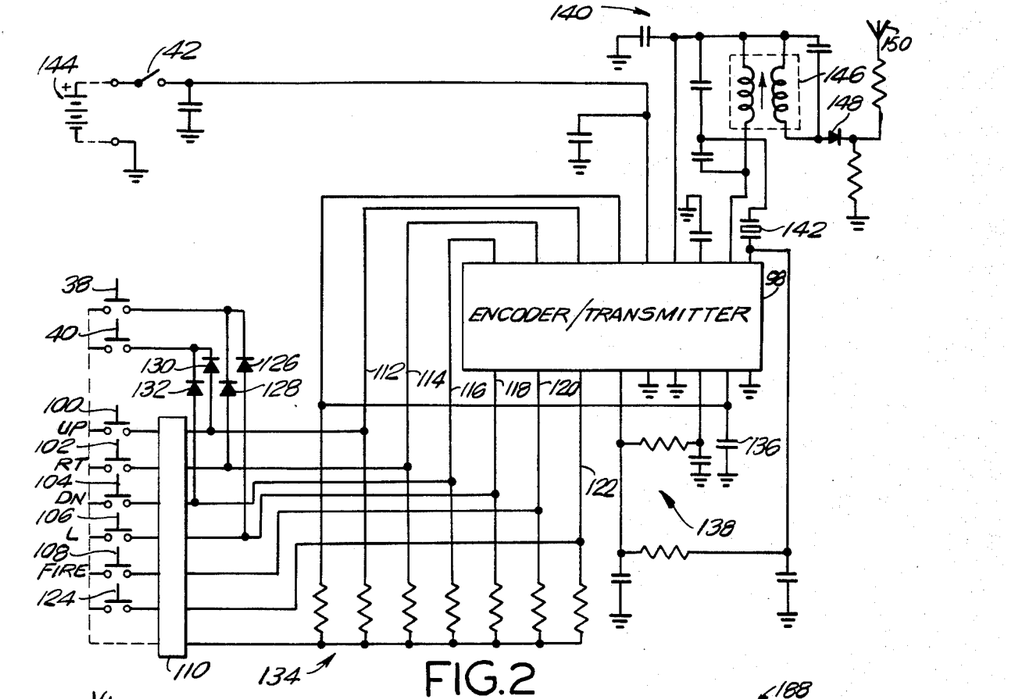
FIG. 2 is a detailed circuit diagram of an embodiment of a transmitter unit which is contained within a control unit of the video computer game.

Referring now to FIG. 2, there is shown a particular circuit including that integrated circuit encoded transmitter unit 98. The general circuit shown in FIG. 2 is identical to that heretofore described in the aforementioned copending application and accordingly, will only be described herein in general terms. Reference is had to the aforementioned copending application, incorporated herein by reference, for details of the circuitry shown in FIG. 2.

The four directional inputs from the movement of the joy stick handle in each of the four orthogonal directions are shown coupled through four switches 100, 102, 104 and 106 respectively corresponding to the up, right, down and left movement of the joy stick. The fifth switch, 108, corresponds to depression of the firing button. These outputs are coupled through a connector 110 which applies a corresponding signal onto one of the five channel lines 112, 114, 116, 118 and 120.

The particular encoder transmitter 98 which is being utilized actually includes a 6th channel line 122. This additional channel line can be utilized to provide one additional switch signal by placing an additional pressure actuated switch, shown at 124. Thus, if only one particular additional switch signal was desired, such as the reset signal, an additional pressure actuated switch could be included on the remote controller unit and operated similar to that of the firing button in order to provide one extra generated reset signal.

However, instead of utilizing a separate pressure actuated switch, it is possible to utilize the existing four orthogonal switches to still provide two additional signals. Specifically, when operating the joy stick, the joy stick can only engage a single one of the pressure actuator switches, or at most two adjacent such switches. However, it is not possible for the joy stick to engage two non-adjacent switches, such as a pair of diametrically opposed switches. Accordingly, in order to generate a reset signal which can be separately identified from the game manipulation signals generated by movement of the joy stick controller, the reset switch 38 provided on the controller unit can be connected to effect a signal similar to a first pair of diametrically opposed, non-adjacent actuator switches. Similarly, the game selector switch 40 on the controller unit can be connected simulate closure of a second pair of diametrically opposed, non-adjacent pressure actuated switches. Of course, should more than four switches be utilized, as long as the switches would not be normally actuated by the joy stick controller, a combination of such pressure actuated switches can be included to provide separately identifiable indications for game signals. Furthermore, in addition to combining two such pressure actuated switches, more than two could be combined so that quite a number of combination of pressure actuated switches can be achieved in order to provide for separately identifiable control signals.

As shown in FIG. 2, closure of the reset switch 38 generates a signal the equivalent of which corresponds to the closure of two non-adjacent switches so that signals are sent onto the channel lines 114, 118. The signals are sent through the diodes 126 and 128. Similarly, closure of the switch 40 controlling the game selection, causes signals to be sent on the channel lines 112, 116 through the diodes 130, 132.

As heretofore explained in the aforementioned copending application, the various resistors 134 are made equal so that in conjunction with timing capacitor 136 a pulse width is sent onto each of the aforementioned channels. The pulse widths together with a sync pulse is provided in order to include a particular frame time. This part of the circuit is formed by means of the associated components shown generally at 138 connected to the encoder/transmitter unit 98 forming the pulse width modulator portion of the circuit.

The modulator and crystal oscillator portion is shown generally at 140 and is tuned by means of the crystal 142 to a particular frequency. Each controller unit would be tuned to a separate frequency identifying that particular controller unit to the receiver unit. All of the various components forming the RF oscillator and modulator are described in the aforementioned copending patent application. The voltage is supplied by means of a portable battery 144 which is connected by means of the ON/OFF switch 42 shown in FIG. 1. At the output is provided a transformer 146 which passes through the diode switch 148 and suitable other components required to send the RF signal through the antenna 150.

With the circuit shown in FIG. 2, the joy stick controller can be utilized not only to generate game manipulation signals but also can be utilized for generation of additional signals such as a game reset signal and a game selector signal all of which will be transmitted from the antenna 150 and suitably encoded as RF signals.

At the receiver unit, there is included a receiver circuit which includes a buffer amplifier which is connected to the antenna and isolates the antenna from a subsequent mixer. A buffer output is applied to a mixer where it is combined with a local oscillator signal in order to produce an intermediate frequency. The intermediate frequency is then amplified through an IF amplifier and applied to a detector whose output closely resembles the original pulse width modulator carrier envelope. The pulse width modulated data is then applied to a serial to parallel decoder such as a shift register. The minimum to maximum variation of the pulse width signals are then converted to logic level high-low states by time constants associated with a level detector circuit. The outputs are then applied through buffers and then applied to the TV game.

As heretofore mentioned in the copending application, much of this circuitry, including the buffer, mixer, crystal oscillator, IF amplifier and detector, can be included in a single integrated circuit typical of which is that produced by National Semiconductor as the integrator circuit LM 1872 Radio Control Receiver/Decoder.

Figure 3:
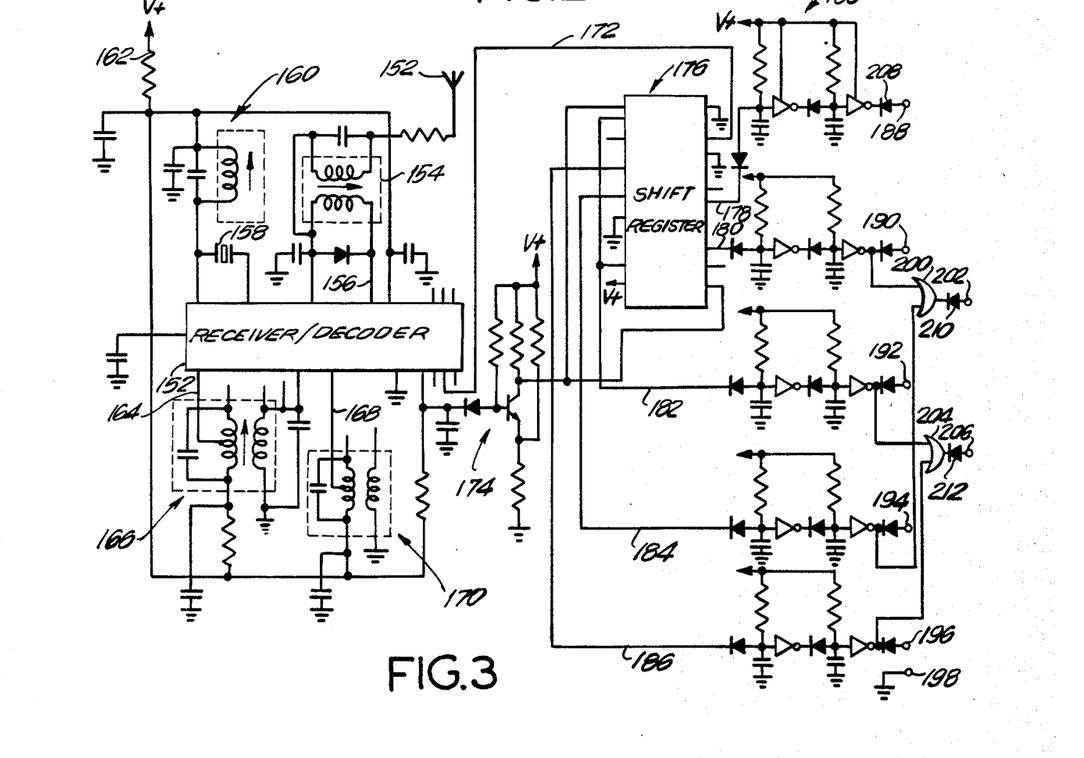
FIG. 3 is a detailed circuit diagram of a receiver circuit contained within the receiver unit of the video computer game.

Referring now to FIG. 3, such integrated circuit receiver/decoder is shown generally at 152. The detailed circuitry for FIG. 3 is described in detail in the aforementioned copending application and will only be described here in general terms. More specific detailed reference is had to the aforementioned copending application which is hereinincorporated by reference.

The antenna 152 receives the various RF signals transmitted by each of the controller units and through the antenna transformer 154 and associated other components, there is provided a tank circuit which is tuned to the particular frequency of the receiver unit. The signal is then sent on line 156 as the mixer input. The local oscillator frequency is controlled by means of the crystal 158. A suitable tuning tank circuit 160 is provided for the local oscillator. Biasing, and bypass couplers are included as various other components. The positive voltage for the device is supplied on line 162. Typically, the AC adaptor converts the line voltage to the necessary voltage needed for the unit.

The mixer output on line 164 is sent to the intermediate frequency mixer transformer, shown generally at 166 including appropriate tank circuits. The IF frequency output is taken on line 168 and passes through the IF transformer shown generally at 170 having an appropriate tank circuit. Appropriate synchronization signals are provided by means of various timing resistors and capacitors, as described in the aforementioned copending application.

Although the receiver encoder 152 has numerous output lines, only a single serial output is provided from one of its channels on line 172. This will be a serial string of pulse width pulses in conjunction with the sync pulse.

In order to obtain the information from all of the input channels, there is provided a comparator, shown generally at 174 which includes a one transistor comparator. The output from the comparator feeds the input to the clock input of a shift register 176. The comparator 174 reconstructs the detector output of the receiver/decoder 152 from the sync timer waveform and feeds it to the clock input of the shift register 176. The channel one output on line 172 then loads the data into the shift register 176. The shift register 176 is typically an integrated circuit CD 4015.

The outputs from the shift register are taken on lines 178, 180, 182, 184 and 186. These all represent the five channel outputs from the shift register 176.

The pulse width modulated parallel signals at the output of the shift register 176 are then converted to logic level signals through the converter circuit 188. Five substantially similar converters are shown. Details of each of these conversion circuits can be found in the aforementioned copending application. Each of the converters convert the pulse width on its respective channel to a logic level signal of either a high or low signal depending upon whether the corresponding switch in the joy stick was closed or not. These signals then appear at the output at the points 188, 190, 192, 194 and 196, which correspond to the five switches on the joy stick controller. These switches together with an additional connection to ground, 198, are coupled through the plug which is inserted into the back of the master control center to provide for the game manipulation signals.

The outputs on points 190 and 194 would represent outputs from two diagonally opposed actuator switches and are correspondingly fed to the AND gate 200. The output from AND gate 200 would provide for one of the extra signals, typically the game reset signal at 202. Similarly, by taking the output signals from 192 and 196 and passing them through the AND gate 204, the game select signal will be provided at point 206. Since the signals for the AND gate 200 and 204 are taken before the output diodes 208 on each of the lines, separate output diodes 210 and 212 are provided at the outputs of the AND gates 200 and 204.

Accordingly with the circuit as shown in FIG. 3, not only are signals provided indicative bf the game manipulation caused by movement of the joy stick handle, but also additional signals are separately identifiable representing the game reset and game select signals.

As was explained in the heretofore mentioned copending application, an additional receiver circuit of the type shown in FIG. 3 would also be provided for each of the separate joy stick controllers. Each of the receivers would be tuned to the particular frequency of the separate joy stick controller. In this way, with two joy stick controllers respectively representing the left and right channels, each of them would send out a signal at a separate frequency and two receiver circuits of the type shown in FIG. 3 would be utilized, each set at a corresponding receiving frequency. However, a single common antenna can be utilized at the receiver for picking up both frequency signals.

Utilizing the circuit shown in FIG. 3, should the controller unit be located at a distance greater than the transmission distance from the receiver unit, the receiver unit would not receive proper signals from the transmitter. Instead, it might cause random signals to be applied to the master control center which would disturb proper operation of the game.

Figure 4:
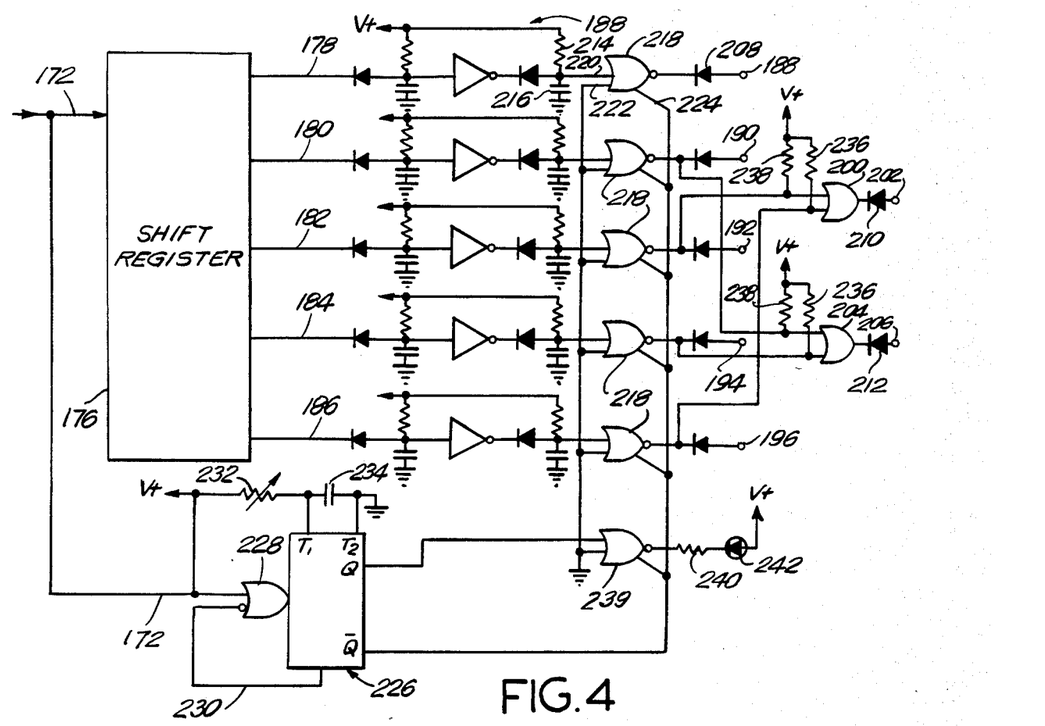
FIG. 4 is a circuit diagram of an output portion of the receiver circuit shown in FIG. 3 and including the additional features of indication means and circuit lock out means.

In order to avoid the production of random signals during non-receiving periods, reference is had to the circuit of FIG. 4. FIG. 4 shows only that portion of FIG. 3 having the five output channels from the shift register 176. Again, these outputs are again applied to the five converters 188 as shown in FIG. 3. However, inbetween the individual output diode 208 and the midpoint of the time constant RC network 214, 216, there are provided individual three input NAND gates 218. One input of the NAND gate comes from the converter 188 on line 220. The other input is grounded at 222. The third input of each NAND gate on line 224 comes from the trigger output $\overline{Q}$ from the one shot multivibrator 226.

The one shot multivibrator is fed through the gate 228 having one input coming from the line 172 which is connected to the output channel from the receiver/decoder and serves as a pulse synchronizing signal. A signal will appear on line 172 whenever the receiver picks up signals from the transmitter. The other input to the gate 228 is the clock signal to the one shot multivibrator on line 230. The variable resistor 232 and capacitor 234 can be set to a desired time period, typically a few seconds.

Accordingly, as long as the receiver picks up a signal from the transmitter, the gates 218 will be maintained in a state to transmit the signal on the signal channel going to that gate so as to feed the master control center of the video computer game. However, when the receiver looses the signal and no longer picks up signals transmitted from the controller units, the one shot 226 triggers so that the output line on 224 to each of the NAND gates 218 goes high and thereby prevents further signals from being transmitted to the master control center. As a result, no random signals will be sent to confuse the game.

As before, the gates 200 and 204 are connected to respectively pick up the game reset and game select signals from alternate non-adjacent channels. Because of the use of the three input gates, pull up resistors 236, 238 must be utilized with the gates 200 and 204.

Although only a single gate 218 and associated circuitry has been explained in detail, it should be understood that similarly other gates at the output of the channel lines 180, 182, 184 and 186 would all be identical.

The Q output from the one shot 226 is utilized as an input to an additional NAND gate 239. The output from this gate passes through a resistor 240 and to an indicating light such as the LED 242. As a result the LED 242 will provide illumination during valid communication from the transmitter to the receiver. Thus, whenever the receiver is receiving signals from the transmitter, an indicator light provided on the receiver unit will be illuminated. When the light goes out, it will provide an indication that the receiver is no longer receiving signals However, because of the additional gates 218, as hereinbefore explained, random signals will not be sent during non-communication time periods.

Figure 5:
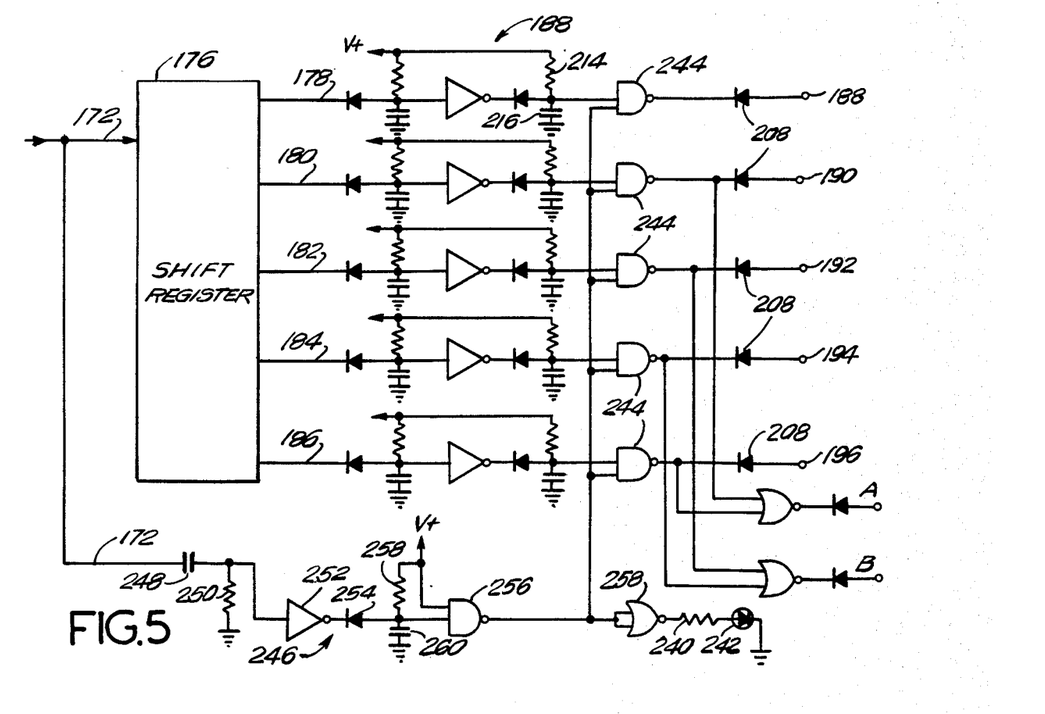
FIG. 5 is a circuit similar to that shown in FIG. 4 and showing another embodiment of the circuit lock out feature and the indicator features.

Referring now to FIG. 5, there is shown an alternate embodiment for providing the elimination of random signals during non-receiving time periods. In FIG. 5, a two input NAND gate 244 is inserted along each of the channel lines 178–186 between the output diodes 202 and the RC time constant circuit 214, 216. One input to the gates 244, comes from the respective channel lines. The other input comes from the one half monostable trigger circuit shown generally at 246. The input to the circuit 246 comes from the sync line 172 which passes through the RC network 248, 250 at the input to the inverter 252. Passing through the diode 254 and then to the NOT gate 256 with appropriate resistor and capacitor connections 258, 260 being provided.

Whenever a sync line appears on line 172, the signal at the output of the gate 256 causes the individual gates 244 to be able to transmit the information on their respective channel lines. However, when loss of signal from the transmitters occur, the monostable 246 prevents each of the gates 244 from sending random signals. The length of time during which the monostable holds the gates is determined by the time constant of the RC network 248, 250.

Again, there is provided an indicator 242 supplied across the resistor 240 by the gate 258 which receives the output from the gate 256. As long as the receiver receives signals from the transmitter the indicator will be illuminated. When the indicator goes out, it means that no signals are being received. However, because of the gates 244, no random signals will be sent to the master control center to disturb the game.

Figure 6:
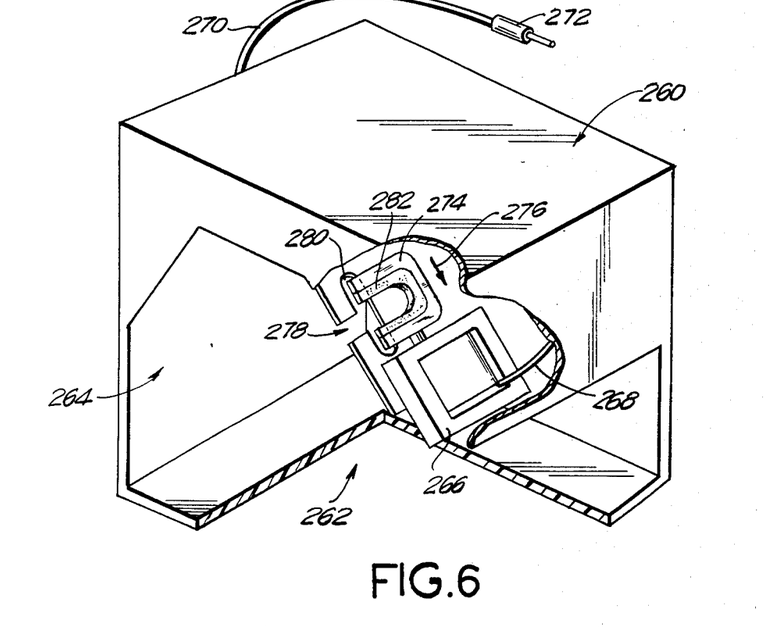
FIG. 6 is a perspective partially cut away view of an actuator unit in accordance with one embodiment of the present invention for mounting onto the master control center for mechanical control of a reset button.

As explained in connection with FIG. 1, the output from the receiver unit 46 is sent to an actuator unit 90 which fits onto the master control center to mechanically operate the reset button and/or the game selector button. FIG. 6 now shows one embodiment of implementing such an actuator unit. As shown in FIG. 6, there is provided a housing 260, shown as a substantially rectangular box, having an opening 262 cut out on its base and a side opening 264 permitting positioning of the housing 260 onto the corner edge of the master control center. Within the housing 260 there is provided a miniature high-force, low current solenoid 266 which is energized through the wires 268. The wires 268 continue into the cable 270 having a plug 272 at the end thereof for insertion into the receiver unit. When a reset signal is sent by the transmitter and subsequently received by the receiver unit, the signal is decoded and sent to energize the solenoid 268. Such energization causes the yoke 274 coupled to the solenoid 266 to move downwardly in the direction shown by the arrow 276. A slot 278 is available for receiving the reset button and an elongated pathway 280 is provided whereby the reset button can move downwardly in the pathway 280 as the yoke 274 is moved in a downwardly direction. A rubber lining 282 can be placed around the yoke 274 to prevent damage to the button on the master control center. When the solenoid 266 is energized by the reset signal, the yoke moves in a downward direction 276 causing resetting of the game. When the reset signal has passed, the yoke 276 will move back to its original position thereby releasing the reset button.

Although only one yoke and solenoid is shown in the housing of FIG. 6, a second similar section yoke and housing could be added to control the game selector button, or other such similar button provided on the master control center.

Figure 7:
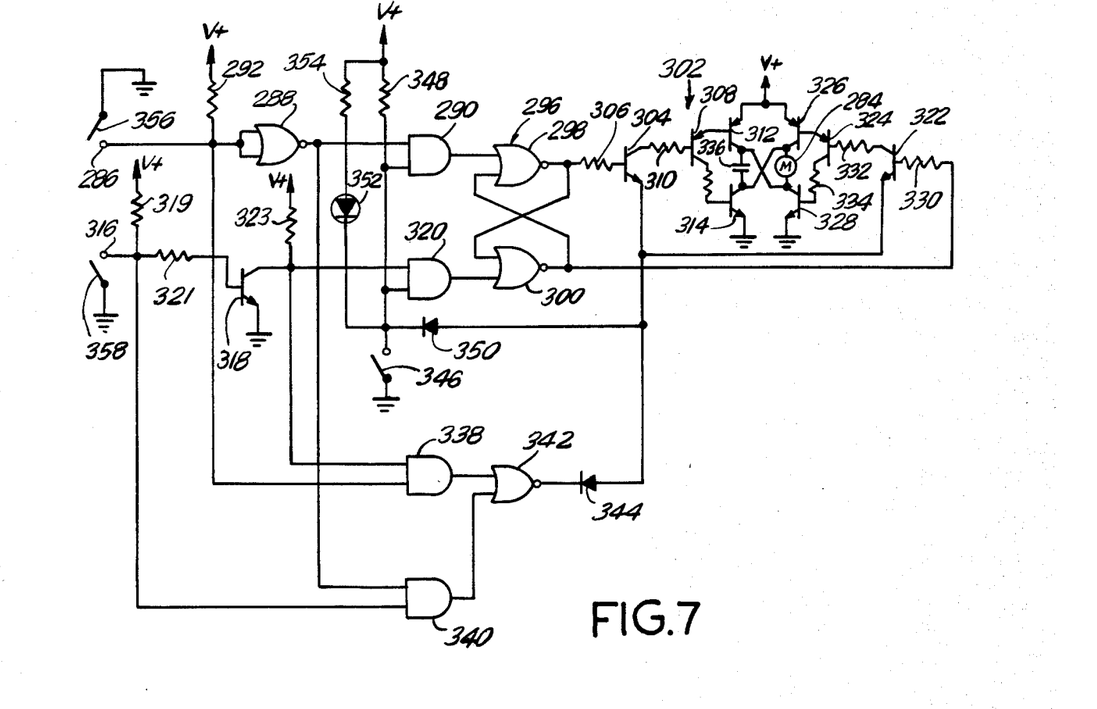
FIG. 7 is a circuit diagram of an actuator circuit contained within an actuator unit and utilizing a motor for operating a lever which can mechanically close a reset button and/or game selector button on a master control center, and FIGS. 8A and 8B respectively show a plan view and a side elevation view of the actuator unit with the respective top and side wall removed, showing the various gearing mechanisms required to operate closure of the reset and game selector buttons on the master control center.

Referring now to FIG. 7, an alternate method of mechanically operating the reset and game selector buttons will be shown. In FIG. 7, a motor 284 is utilized as the mechanical actuator. As will hereinafter be explained, the motor operates a two position lever which can respectively engage the reset button or the game selector button. When the motor is caused to rotate in a first direction, it moves the lever into one position so as to depress the reset button. When the motor is caused to operate in the opposite direction, it causes the lever to move in its second position so as to depress the game selector button.

In the circuit shown in FIG. 7, the reset signals decoded by the receiver are coupled to the input at 286 and are sent through the inverter 288 to the AND gate 290. An appropriate resistor 292 couples the inverter 288 to the voltage source.

The output from gate 290 sets the flip flop circuit 296 composed of the cross connected gates 298, 300. The output sets the motor control driver circuit 302 so as to turn the motor in one direction. Specifically, it will operate the first transistor 304 through the resistor 306 which in turn controls the transistor 308 across resistor 310 causing transistor 312 to become active turning the motor 284 in one direction. Transistor 314 connects the voltage through transistor 312 to ground.

When a game selector signal is received at the input 316, it feeds the inverter transistor 318 so as to turn on the gate 320. Appropriate voltage resistors 319 and 321 are connected at the input of the transistor 318 and resistor 323 is connected at its output.

The output of the gate 320 again feeds through the flip flop 296. This time the transistors 322, 324, 326 and 328 are turned on through the respective resistors 330, 332 and 334 causing the motor to operate in the opposite direction. Capacitor 336 is interconnected across the motor.

When a game reset signal is received on line 286, the signal input at line 316 must not be present. Accordingly, the presence of one of these signals and the absence of the other will respectively turn on one of the gates 338, 340. By using the two gates 338, 340 it insures that only one signal will be received at a time and thereby prevent the motor from being forced to respond to opposing operating signals.

The output from the gates 338, 340 feeds the NAND gate 342 permitting the respective transistor 304 or 322 to turn on across the diode 344.

A normally open switch 346 is provided. When a reset or game selector signal is received, switch 346 is manually or remotely operated to close. Closing such switch causes the voltage to pass across the resistor 348 thereby locking out the gates 290 and 320. This prevents a subsequent signal from being sent to the motor until after the motor has completely responded to the first signal. The current from the motor circuit forward biases the diode 350 with the switch 346 closed to permit the current to flow through the switch 346 to ground.

When the switch 346 is closed indicating that the motor is operating in its forward or reverse mode, depending upon whether a reset signal or a game selector signal is received, the indicator light 352 will turn on with the current passing across the resistor 354.

In addition to receiving the remote signals transmitted from the controller unit to reset or select a game, local control can also be provided. Specifically, a switch 356 is locally available on the actuator unit which sends a signal onto the input 286 to reset the game. Another switch 358 is available for providing game select signals locally. Therefore, although the signals can be provided remotely at the controller unit, they can also be provided directly at the actuator unit itself without having to remove the actuator unit from the master control center once it has been attached.

With the circuit shown in FIG. 7, when a game selector or reset signal is sent at the transmitter controller unit, it is picked up by the receiver, decoded, and sent to the circuit shown in FIG. 7 contained within the actuator unit. This will cause the motor to respond by moving it either in forward or reverse direction, depending upon which signal is received. The motor will make one revolution pushing the lever in one of its two positions. A friction clutch can be provided to insure that the motor stops. After one revolution, the motor can hit a pin contained on one of the gears causing the switch 346 to open so that the circuit will then be available to receive the next signal. If the player keeps his finger on the reset or game select switch at the transmitter the motor will again operate another revolution. Otherwise, if only a single switch depression is made at the transmitter, the motor will only make one revolution and then stop.

Figure 8A:
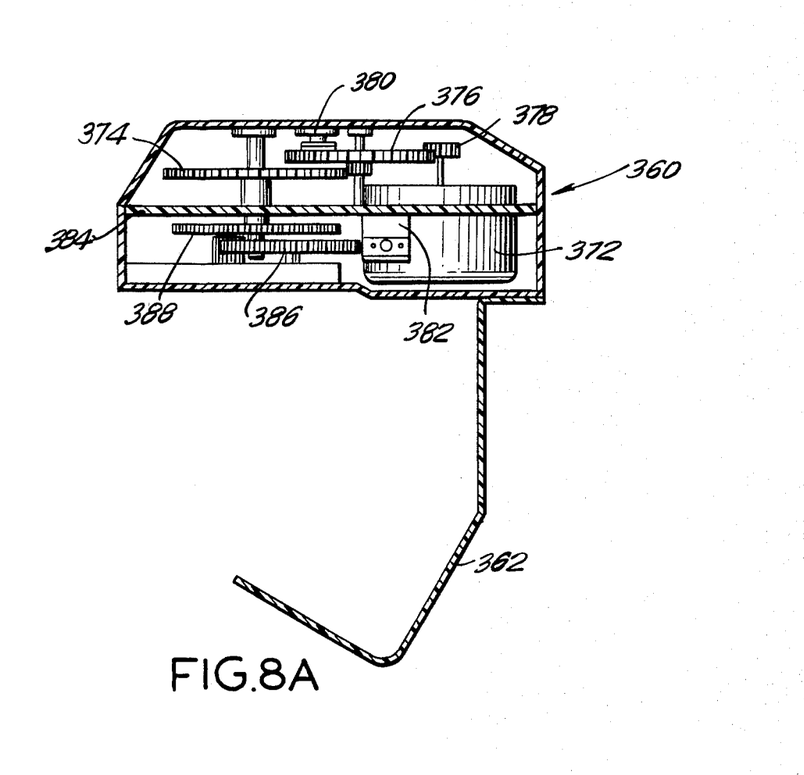
Figure 8B:
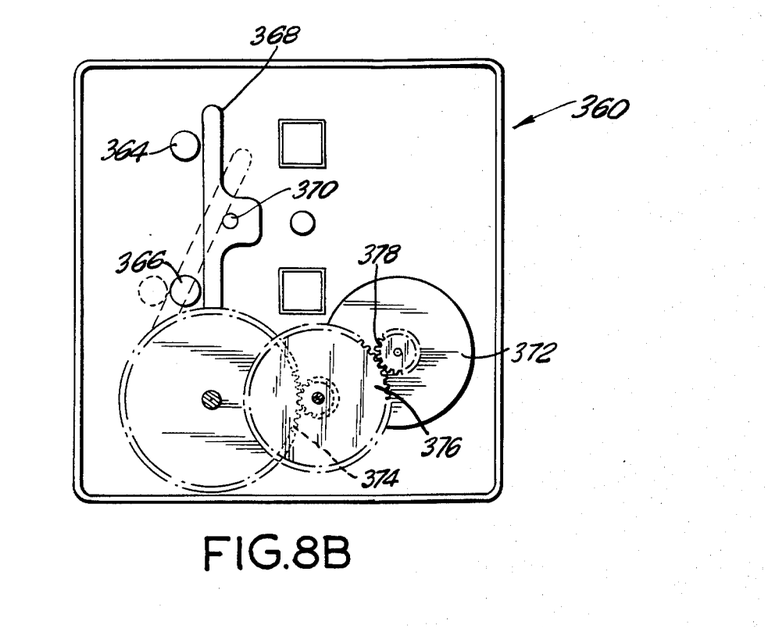

Although numerous housings could be utilized to retain the circuit of FIG. 7 with the motor and lever, schematically one such arrangement is shown in FIGS. 8A and 8B. The housing 360 contains all the components. A series of lever arm sections 362 are shaped so as to retain the housing 360 positioned appropriately over the actuator buttons on the master control center. The buttons will extend into the housing as shown by the button switches 364, 366. A lever 368 is pivoted at its approximate center 370 and is available for operation by the motor 372 in either of two directions so as to push downward the button 364 or the button 366. As shown in dotted lines, the lever 368 can be depressed in one direction by the motor so as to push downward the button switch 366 to actuate it. The lever then returns to its normal position. The lever could also be moved into the opposite direction to engage and push downward on the reset button switch 364.

The motor 372 operates the lever by means of a series of gears 374, 376, and 378. A friction clutch arrangement 380 is provided on one of the gears to slow the motor down. The motor is supported by means of the support bracket 382 depending from the support plate 384 contained in the housing. Other gears 386, 388 are also shown, as is well known in the art for such coupling arrangement. Of course, other type of arrangements could be utilized for converting the motor operation for turning the lever in the appropriate direction.

Although a specific actuator unit was shown for use with a particular master control center housing, it should be understood that similar housing arrangements or other actuator units could be formed so as to engage the various types of switching arrangements made on other types of master control centers.

There has been disclosed heretofore the best embodiments of the invention presently contemplated. However, it is to be understood that various changes and modifications may be made thereto without departing from the spirit of the invention.

We claim:

1. A remote control system for a video computer game including a master control center having a mechanical reset button, said remote control system comprising:
   a portable controller unit for generating manipulation signals indicative of game movements, reset switch means on said controller unit for generating a game reset signal, and transmitter means for transmitting the manipulation signals and the game reset signal as RF signals;
   receiver means for receiving said RF signals, and converter means for converting the received RF signals into control signals for application to the video computer game;
   said receiver means including an actuator unit for coupling onto the master control center and converting one of said control signals representing the game reset signal into a reset control signal for operating the reset button on the master control center; and
   said actuator unit including housing means for fitting onto the master control center and covering the reset button, and mechanical actuator means for mechanically operating the reset button.

2. A remote control system as in claim 1, wherein said mechanical actuator means comprises a solenoid energized by said reset control signal, and a movable yoke operated by said solenoid for operatively engaging said reset button.

3. A remote control system as in claim 1, wherein said mechanical actuator means comprises a motor energized by said reset control signal, and movable lever means coupled to said motor for operatively engaging said reset button.

4. A remote control system as in claim 1, wherein said portable controller unit comprises an elongated handle which can radially move with respect to its axis about an axial pivot from a normally resting position, a plurality of pressure actuated switches circumscribing the axis of the handle, wherein movement of said handle can cause closure of a single or pair of adjacent pressure actuated switches, and wherein said reset switch means is coupled to cause the effect of closure of non-adjacent pressure actuated switches.

5. A remote control system for a video computer game including a master control center having a mechanical reset button and a mechanical game selector button, said remote control system comprising:
   a portable controller unit for generating manipulation signals indicative of game movements, first switch means on said controller unit for generating a game reset signal, and transmitter means for transmitting the manipulation signals and the game reset signal as a set of RF signals;
   receiver means for receiving said set of RF signals, and converter means for converting the received set of RF signals into a set of control signals for application to the video computer game;
   said receiver means including an actuator unit for coupling onto the master control center and converting a signal of said set of control signals representing the game reset signal into a reset control signal for operating the reset button on the master control center;
   second switch means on said controller unit for generating a game selector signal, said transmitter means transmitting said game selector signal as one RF signal, said converter means converting said one RF signal into one control signal, and said actuator unit converting said one control signal representing the game selector signal into a selector control signal;
   said actuator unit including housing means for fitting onto the master control center and covering the reset button and the game selector button; and
   mechanical actuator means on said actuator unit for mechanically operating the reset button in response to said reset control signal, and mechanically operating the game selector button in response to said selector control signal.

6. A remote control system as in claim 5, wherein said mechanical actuator means comprises a motor energized by said reset control signal to rotate in a first direction and by said selector control signal to rotate in an opposite direction, and lever means coupled to said motor for operatively engaging said reset button when said motor rotates in said first direction and operatively engaging said selector button when said motor rotates in said opposite direction.

7. A remote control system as in claim 6, wherein said actuator unit comprises lock out circuit means for preventing application of said reset control signal and said selector control signal when the motor is rotating.

8. A remote control system as in claim 6, wherein said actuator unit comprises a local switch means for generating said reset control signal and said selector control signal directly at said actuator unit.

9. A remote control system as in claim 6, wherein said actuator unit comprises indicator means for providing an indication when said motor is operating.

* * * * *